United States Patent
Kuriki et al.

(10) Patent No.: US 7,749,623 B2
(45) Date of Patent: Jul. 6, 2010

(54) METHOD OF CONTROLLING FUEL CELL SYSTEM

(75) Inventors: Hironori Kuriki, Tokyo (JP); Hisatoshi Fukumoto, Tokyo (JP); Takashi Nishimura, Tokyo (JP); Hiroaki Urushibata, Tokyo (JP); Hajimu Yoshiyasu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1512 days.

(21) Appl. No.: 11/080,455

(22) Filed: Mar. 16, 2005

(65) Prior Publication Data

US 2005/0271911 A1    Dec. 8, 2005

(30) Foreign Application Priority Data

Jun. 8, 2004   (JP)   ............... 2004-170189
Nov. 18, 2004  (JP)   ............... 2004-334276

(51) Int. Cl.
*H01M 8/00* (2006.01)
(52) U.S. Cl. .......................................... 429/13; 429/22
(58) Field of Classification Search .............. 429/12, 429/13, 30, 22, 23, 24
See application file for complete search history.

(56) References Cited

U.S. PATENT DOCUMENTS

| | | | |
|---|---|---|---|
| 5,023,150 A * | 6/1991 | Takabayashi | ............... 429/22 |
| 6,399,231 B1 * | 6/2002 | Donahue et al. | ............... 429/13 |
| 2002/0098393 A1 | 7/2002 | Dine et al. | |
| 2003/0224228 A1 | 12/2003 | Reiser et al. | |
| 2004/0137292 A1 * | 7/2004 | Takebe et al. | ................. 429/23 |
| 2004/0234826 A1 | 11/2004 | Stuhler | |

FOREIGN PATENT DOCUMENTS

| | | |
|---|---|---|
| DE | 102 95 887 T5 * | 1/2001 |
| DE | 102 95 887 T5 | 7/2007 |
| EP | 1 283 557 A1 | 2/2003 |
| JP | 1-128362 | 5/1989 |

\* cited by examiner

*Primary Examiner*—Patrick Ryan
*Assistant Examiner*—Monique Wills
(74) *Attorney, Agent, or Firm*—Oblon, Spivak, McClelland, Maier & Neustadt, L.L.P.

(57) ABSTRACT

A fuel cell is obtained, in which oxidation degradation of a catalyst in the cathode can be prevented even if a large volume of air instantaneously penetrates into the cell, and the fuel-cell characteristics also do not deteriorate even though starting-up, shutting-down and pausing operations are repeatedly performed. As a method of controlling a fuel cell system, hydrogen-containing fuel gas is supplied to the anode and oxidant gas is supplied to the cathode, an external load is connected between the anode and the cathode so that the fuel cell generates electric power, the external load is disconnected after the power generation, a resistor is connected between the anode and the cathode, supply of the oxidant gas is stopped, and then supply of the fuel gas is stopped after the potential at the cathode has dropped to equal to or lower than the potential at which hydrogen evolution starts, so as to pause the fuel cell.

12 Claims, 7 Drawing Sheets

METHOD OF CONTROLLING FUEL CELL SYSTEM

BACKGROUND OF THE INVENTION

1. Field of the Invention

The present invention relates to methods of controlling fuel cell systems that generate electric power utilizing electrochemical reactions, and are used in, for example, electric vehicles.

2. Description of the Related Art

In a conventional fuel-cell-system shutdown method, the system has been configured in such a way that fuel gas or gas diluted with an appropriate amount of inert gas has been made to flow over an anode, inert gas has been flown over only a cathode in order to purge oxidant gas, and a resistor has been connected to the output of the fuel cell; thereby, the system has been controlled, by the resistor being connected to or disconnected from the output, so that the cell voltage has become approximately equal to EMF (electromotive force) of the theoretical hydrogen electrode concentration cell (for example, refer to Patent Document 1).

[Patent Document 1]
Japanese Laid-Open Patent Publication 128,362/1989 (on page 2)

SUMMARY OF THE INVENTION

In the conventional method of stopping fuel-cell-system operation, because the system has been controlled by a resistor being connected to or disconnected from an output when the cell is in a pause, due to the existence of only inert gas at a cathode, while the cell is a pause, it takes a long time before the resistor is connected to the output and hydrogen is evolved at the cathode, if large amounts of air is instantaneously penetrated into the cathode; as a result, oxidation degradation of a catalyst formed in the cathode has been unable to be completely prevented. Moreover, in a case in which starting up, shutting down, and pausing the fuel cell system are repeatedly operated, because the cathode is exposed to oxidation atmosphere, oxidants have been evolved on the surface of the catalyst; consequently, a problem in which electrochemical reactivity gradually deteriorates has occurred. The oxidation degradation of the catalyst in the cathode means a phenomenon in that the catalyst included in the catalyst layer of the cathode is deactivated; specifically, when platinum catalyst particles as the catalysts are carried on carbon particles, oxygen in penetrating air reacts with the carbon particles, and the carbon particles change into carbon dioxide so that the particles are exhausted, and then, after the platinum catalyst particles have been eliminated from the carbon particles, the platinum catalyst particles aggregate with each other; consequently, due to loss of conductivity to the cathode electrode, the particles becomes inoperative as the catalyst.

An objective of the present invention, which has been made to solve the foregoing problem, is to obtain a fuel cell system that can prevent oxidation degradation of a catalyst in a cathode thereof even if large amounts of air instantaneously penetrates into the system while the cell is paused, in which the characteristics do not deteriorate even if starting up, shutting down, and pausing the fuel cell system are repeatedly operated.

A method of controlling a fuel cell system according to the present invention includes: a step of supplying fuel gas including hydrogen to the anode, and for supplying oxidant gas to the cathode; a step, after power generation has been performed with an external load being connected between the anode and the cathode, and then the external load has been disconnected, of connecting a resistor between the anode and the cathode; a step of stopping supply of the oxidant gas; and a step of stopping supply of the fuel gas, after the potential at the cathode has dropped to equal to or lower than the potential at which hydrogen evolution starts, so as to pause the fuel cell.

Moreover, another method of controlling a fuel cell system according to the present invention includes: a step of supplying fuel gas including hydrogen to the anode, and for supplying oxidant gas to the cathode; a step, after power generation has been performed with an external load being connected between the anode and the cathode, and then the external load has been disconnected, of connecting a resistor between the anode and the cathode; a step of stopping supply of the oxidant gas; and a step of pausing the fuel cell with reductant being placed into a space leading to the cathode, after the potential at the cathode has dropped to equal to or lower than the potential at which hydrogen evolution starts, so as to pause the fuel cell.

According to the present invention, an atmospheric state surrounding the spaces leading to the anode and cathode can be made to be reductive while the fuel cell is paused, and even if large amounts of air mixedly penetrates into the cell instantaneously, hydrogen or reductant reacts with oxygen in air, so that the oxygen can be consumed.

Moreover, oxidants on the surface of the catalyst formed, while the cell is paused, in the cathode can be deoxidized; thus, the catalyst can be activated.

DETAILED DESCRIPTION OF THE PREFERRED EMBODIMENTS

Embodiment 1

Figure 1:
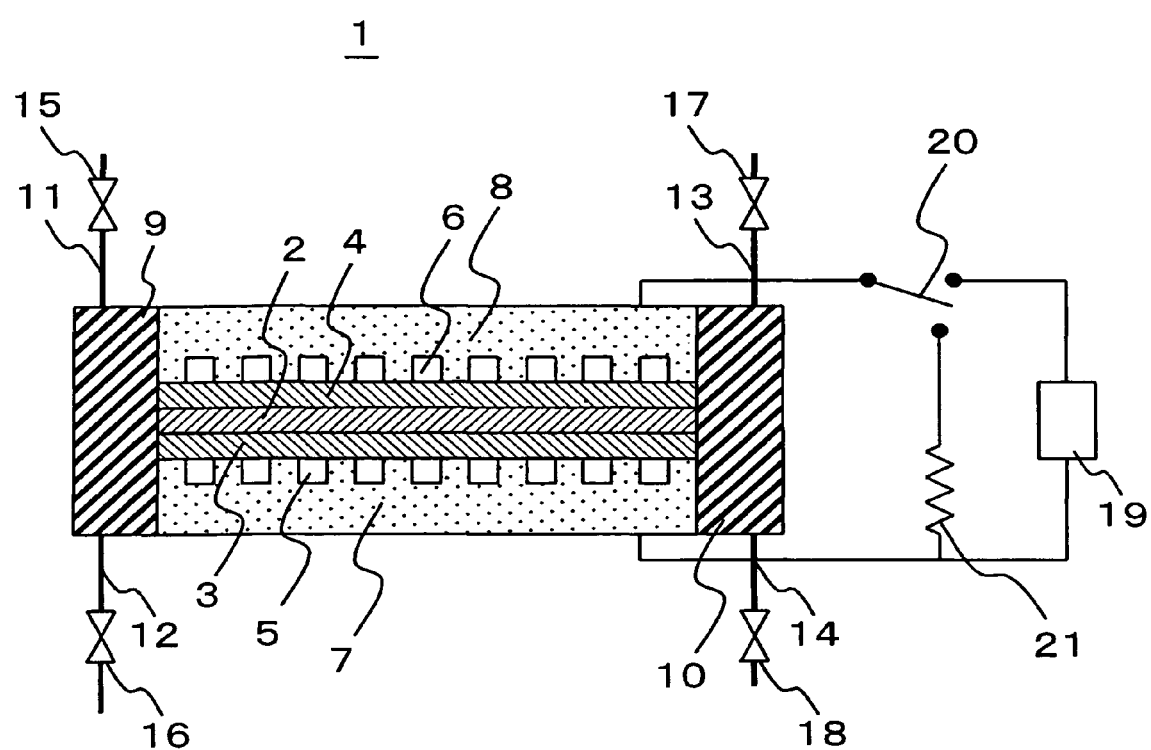
FIG. 1 is a schematic view illustrating an outline of a fuel cell according to Embodiment 1 of the present invention.

FIG. 1 is a schematic view illustrating a fuel cell 1 in Embodiment 1 for carrying out the present invention. In FIG. 1, an anode 3 and a cathode 4 are provided on each face of a polymer electrolyte membrane 2, and catalyst layers (not illustrated) that are electrochemical reaction fields are formed on the plane where the electrodes and corresponding faces of the polymer electrolyte membrane 2 are facing each other. Separators 7 and 8 having gas flowing channels 5 and 6, respectively, are provided outside each electrode. Gas seals 9 and 10 are provided tightly encircling the anode 3 and cathode 4. Manifold holes (not illustrated) for supplying to or exhausting from the gas flowing channels 5 and 6 fuel gas or oxidant gas, respectively, are provided on the gas seals 9 and 10, and an oxidant-gas supplying line 11, a fuel-gas supplying line 12, an oxidant-gas exhausting line 13, and a fuel-gas exhausting line 14 are connected to each of the manifold holes. The oxidant-gas supplying line 11 and oxidant-gas exhausting line 13 are connected to the flowing channel 6 for supplying with the oxidant gas the cathode 4, meanwhile the fuel-gas supplying line 12 and fuel-gas exhausting line 14 are connected to the flowing channel 5 for supplying with the fuel gas the anode 3. An oxidant-gas supplying-amount adjusting means 15 is connected to the oxidant-gas supplying line 11 so as to enable the supplying amount of the oxidant gas to be adjusted, meanwhile a fuel-gas supplying-amount adjusting means 16 is connected to the fuel-gas supplying line 12 so as to enable the supplying amount of the fuel gas to be adjusted. Moreover, an oxidant-gas exhausting-amount adjusting means 17 and a fuel-gas exhausting-amount adjusting means 18 are connected to the oxidant-gas exhausting line 13 and the fuel-gas exhausting line 14, respectively.

As the polymer electrolyte membrane 2, a polymer electrolyte membrane having proton conductivity, gas barrier characteristics, and electrical insulation characteristics is used; for example, a polymer electrolyte membrane consisting of a perfluorinated backbone and a sulfonic group is used. The catalyst layer is composed of, for example, metallic microparticles such as platinum catalyst particles that are carried on carbon particle surfaces and have catalytic activity, and polymer binders; moreover, additives such as polymer particles are mixedly added as the need arises. These additives are used for controlling the hydrophilic properties or the hydrophobic properties, or controlling the porosity, of the catalyst layer. As the methods of producing the catalyst layers, methods are listed in which the layers are, for example, directly formed on the surfaces of the polymer electrolyte membrane 2, formed by layers being transferred onto the surfaces of the polymer electrolyte membrane 2 after having been formed on the surfaces of another substrates, or the catalyst layers are jointed to the polymer electrolyte membrane 2 after the layers having been formed on the surfaces of the anode 3 and the cathode 4. In the anode 3 and cathode 4, in order to diffuse and supply over the entire catalyst layers gases supplied through the flowing channels 5 and 6, the gas permeability and the electrical conductivity are needed; therefore, they are generally composed of a carbon fiber such as carbon paper or carbon cloth. As the separators 7 and 8, for example, a carbon board having a minute structure and electrical conductivity is used, and ditches are provided so as to form the flowing channels 5 and 6.

A method of controlling the fuel cell 1 configured as described above is explained. The fuel cell 1 is connected to a resistor 21 through a switch 20, between the anode 3 and the cathode 4. Here, because the separators 7 and 8 are composed of, for example, a carbon board having electrical conductivity, the resistor 21 is connected between the separator 7 stacked on the anode 3 and the separator 8 stacked on the cathode 4. The effective area (the area in which the catalyst layer is formed) of the anode 3 or cathode 4 is approximately 100 cm$^2$. Next, in a state in which the fuel cell 1 was kept at 75° C., for example, hydrogen gas having a dew point of 70° C., as the fuel gas, was made to flow through the flowing channel 5 from the fuel-gas supplying line 12 to the anode 3, with a flow rate (approximately 340 ml/min) corresponding to the utilization of 80%, and air having a dew point of 70° C., as the oxidant gas, was made to flow through the flowing channel 6 from the oxidant-gas supplying line 11 to the cathode 4, with a flow rate (approximately 970 ml/min) corresponding to the utilization of 50%, so that current of 25 A flowed when the system generated electric power. The reason why the fuel gas and oxidant gas are made to flow in the state containing water is that this polymer electrolyte membrane 2 needs to be wet, in order for the polymer electrolyte membrane 2 to have proton conductivity. Here, the utilization is defined by a ratio of the gas amount utilized in the electric generation and the supplied amount of the gas. Here, all means including the oxidant-gas supplying-amount adjusting means 15, fuel-gas supplying-amount adjusting means 16, oxidant-gas exhausting-amount adjusting means 17, and fuel-gas exhausting-amount adjusting means 18 are adjusted in such a way that the fuel gas and oxidant gas flow with a needed gas flowing amount. Next, the fuel cell 1 was brought into a normal operation state with the cell being switched from the resistor 21 to an external load 19 by the switch 20. The generated voltage of the fuel cell 1 was 0.73 V when the system started to operate.

After 100 hours operation, the power generation of the fuel cell 1 was shut down through the following procedure. The load between the anode 3 and cathode 4 was at first changed from the external load 19 to the resistor 21 (30 mΩ) by the switch 20, and then the oxidant-gas supplying-amount adjusting means 15 and oxidant-gas exhausting-amount adjusting means 17 were closed so that the flow rate became nil ml/min. Here, because oxygen in the air remaining in the cathode 4 reacts with hydrogen to produce water, only nitrogen remains mostly in the oxidant-gas supplying line 11 connected to the cathode 4. Therefore, the potential of the cathode 4 gradually decreases, and then becomes 0.1 V or less due to the increasing of the concentration polarization based on the oxygen diffusion-rate determination. Here, in the anode 3 and cathode 4, the following reactions occur, and a hydrogen/hydrogen concentration cell is formed; resultantly, hydrogen is evolved. The potential of the cathode at this time is referred to as a hydrogen evolution potential.

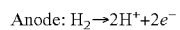

Anode: $H_2 \rightarrow 2H^+ + 2e^-$

Cathode: $2H^+ + 2e^- \rightarrow H_2$

The potential in which hydrogen starts to evolve is determined by the Nernst equation (1), and varies with temperature, hydrogen gas concentration, etc.

$$E = -(RT/2F)\ln(P_{H2-c}/P_{H2-a}) \qquad (1)$$

In equation (1), E denotes a generated voltage, R denotes the gas constant, T denotes temperature, F denotes the Faraday constant, $P_{H2-c}$ denotes a partial pressure of hydrogen in the cathode, and $P_{H2-a}$ denotes a partial pressure of hydrogen in the anode. In this embodiment, the hydrogen evolution potential was 0.1 V or less. In order to securely evolve hydrogen, the potential is preferably decreased not more than 0.05 V Here, because hydrogen is supplied from the fuel-gas supplying line 12, a space leading to the anode is filled with hydrogen.

According to the above described procedure, after the hydrogen evolution was checked at the cathode side, the fuel-gas supplying-amount adjusting means 16 and fuel-gas exhausting-amount adjusting means 18 were closed so that the hydrogen gas flow rate became nil ml/min. Therefore, when the cell is in a pause state, the gas supplying/exhausting lines to the anode and cathode, that is, the gas-amount adjusting means 15, 16, 17 and 18 are blocked, and the spaces leading to the cathode and anode each are in a sealed state; however, even in an extreme case in which air mixedly penetrated into the spaces leading to the anode and cathode, according to this embodiment, measures can be taken to prevent the oxidation degradation of the electrodes. That is, if air mixedly penetrates into the space leading to the cathode, oxygen in the air is consumed by a redox reaction with hydrogen existing in the space leading to the cathode. After this hydrogen has been consumed, if air further penetrates, because each of the electrodes is electrically shorted through the resistor, the hydrogen is oxidized into hydrogen ion at the anode, and then this hydrogen ion moves to the cathode through the electrolyte membrane and deoxidize oxygen in the air having mixedly penetrated. After oxygen has been exhausted, hydrogen electrically moves between each of the electrodes through the electrolyte membrane in such a way that the difference between the hydrogen concentrations at each of the electrodes is removed. That is, for example, in a case in which hydrogen concentration in the cathode is lower than that in the anode, the hydrogen is oxidized into a hydrogen ion in the anode, and the hydrogen ion moves through the electrolyte membrane, and then is deoxidized into hydrogen in the cathode; consequently, equilibrium is maintained between the electrodes. Owing to this mechanism, the interiors of both electrodes are maintained in an atmosphere always filled with hydrogen. After the fuel cell has been maintained in this state, the fuel cell starts to operate. Here, the interior-atmosphere of the electrodes just before the operation was measured by gas chromatography analysis, resulting in the hydrogen concentration of 70 vol. %.

Figure 2:
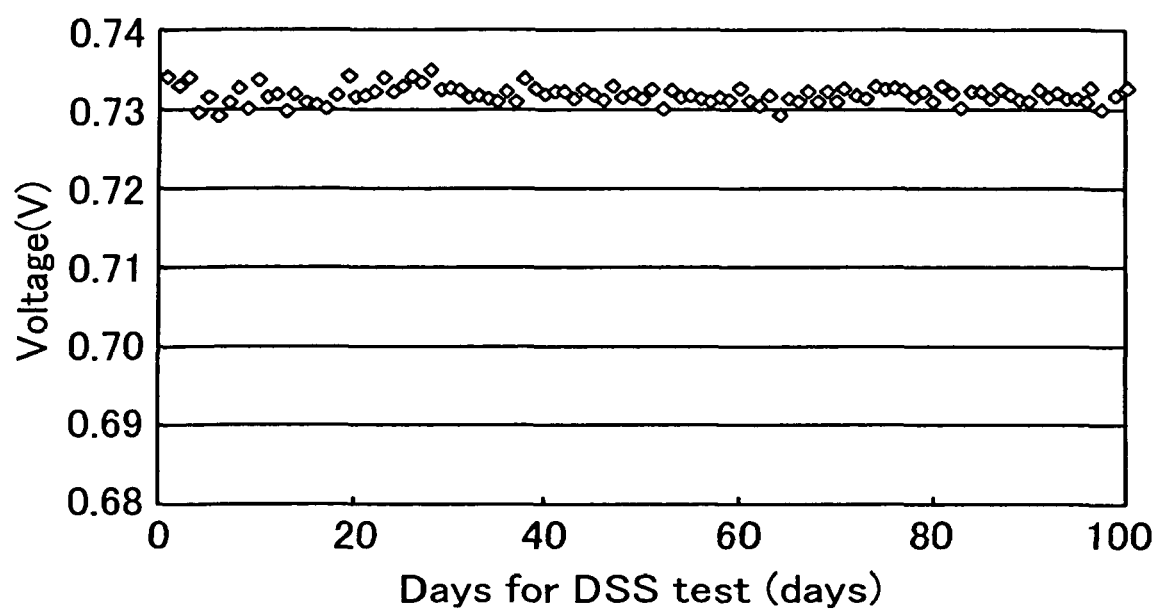
FIG. 2 is a characteristics diagram representing relationships between the number of days for DSS test and generation voltages according to Embodiment 1 of the present invention.

In order to evaluate the characteristics of the fuel cell in this embodiment, a test (DSS test: daily start up and shut down test), in which, after 8 hours continuous generation per day was performed, according to the above described procedure, the fuel cell was shut down and maintained therein for 16 hours, was repeatedly performed for 100 days, and then generated-voltage variation over time in the fuel cell was measured. As a method for the measurement, generated voltage of the fuel cell was measured in such a method that the cell ran 4 hours after its generation started and then the generated voltage was measured every day. FIG. 2 is a view illustrating a generated-voltage variation of the fuel cell according to DSS test; as a result, the generated voltage has scarcely decreased for 100 days.

In the control method for such configured fuel cell, when air penetrates from the exteriors into the space leading to the anode or the space leading to the cathode during pause of the cell, because hydrogen always exists in the interior, redox reaction between oxygen in the air and the hydrogen occurs, and water is produced accordingly; as a result, the penetrated oxygen is consumed. Consequently, losses of the carbon particles in the catalyst layers, as well as degradation of the electrodes, can be prevented.

Moreover, although the cathode of the fuel cell lays in a relatively high potential and is exposed in the oxidation atmosphere during the operation, as in this embodiment, by the cathode potential being decreased so as to evolve hydrogen during the cell pause, the cathode comes into a state of a reductive atmosphere due to the evolved hydrogen. Therefore, even if oxides that can decrease the electrochemical reactivity evolve on the faces of the catalysts in the cathode catalyst layer during the operation, the reduction processing is performed during the cell pause; consequently, there is an effect of the cathode catalysts being activated again.

Furthermore, water is produced with oxygen being consumed in the cathode during the operation; because the water produced due to the oxidant streaming concentrates in the downstream region, there may be a possibility in that the water distributes non-uniformly on the electrolyte membrane. According to this embodiment, because, during the cell pause, the cathode is made to be at low-potential to evolve hydrogen with the oxidant-gas supplying being shut down, in a state in which water is not produced, a humidified gas uniformly streams over the surface of the anode, resulting in an effect of the water distribution being uniformized in the polymer electrolyte membrane.

Figure 3:
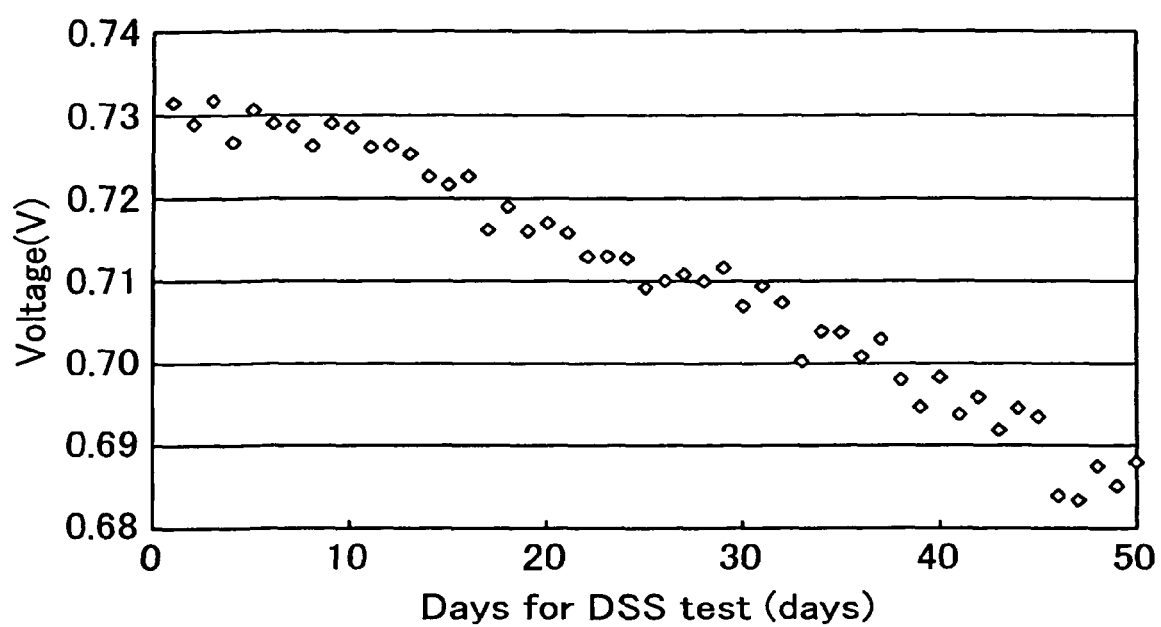
FIG. 3 is a characteristic diagram representing relationships between the number of days for DSS test and generation voltages according to Embodiment 1 of the present invention.

In order to compare conventional characteristics with those in this embodiment, while the fuel cell was paused, the space leading to the anode was filled with hydrogen, meanwhile the space leading to the cathode was filled with nitrogen, as an inert gas, instead of the fuel gas, and the generated voltage of the fuel cell was monitored using a voltmeter; thus, the same DSS test as described above was carried out with the resistor being connected to or disconnected from the cell so that the generated voltage became a voltage in which hydrogen was not evolved in the cathode. FIG. 3 is a view illustrating generated-voltage variation of the fuel cell according to this DSS test; a voltage of approximately 0.05 V decreased for 50 days. The losses of the carbon particles composing the catalyst in the cathode are irreversible, and, once the particles are lost, they will never be restored; the generated voltage therefore gradually decreases during the DSS test. In contrast, in this embodiment, because hydrogen always exists in the space leading to the anode or the space leading to the cathode during the cell pause, there is an effect of the catalyst being activated during the cell pause; consequently, the fuel cell can be obtained, in which the characteristics do not deteriorate, even though operations of starting up, shutting down, and preserving are repeated.

Here, in this embodiment, air and hydrogen were used as the oxidant gas and the fuel gas, respectively; however, as the oxidant gas, oxygen gas, mixed gas that is mixture of inert gas and oxygen gas, etc., can be used other than air, meanwhile, as the fuel gas, hydrogen gas including carbon-dioxide obtained by reforming methanol, kerosene, etc. can be used other than hydrogen gas.

Moreover, in this embodiment, the control method has been explained in which the fuel cell is composed of a pair of the cathode and anode as illustrated in FIG. 1; however, in a fuel cell stackingly configured in such a way that the anode-side separator 7 where the fuel gas flowing channel 5 is provided is placed on the side of the anode 3, and the cathode-side separator 8 where the oxidant-gas flowing channel 6 is provided is placed on the side of the cathode 4, and then the anode 3, separators 7 and 8, cathode 4 are stacked, the same control method as that in this embodiment can be also applied.

Furthermore, if the external load 19 has a load-control function for controlling the load so that the fuel cell 1 can generate constant current of approximately 25 A, stable generation characteristics can be maintained, in which the current does not vary.

Embodiment 2

In a case in which, when the fuel cell is shut down, the hydrogen concentration is relatively low in the space leading to the anode and the space leading to the cathode, the hydrogen may be completely consumed in a short time due to air mixedly penetrating from the exteriors during the cell pause; consequently, oxidation degradation of the electrodes possibly occurs. In Embodiment 2, an effect on cell characteristics was investigated with respect to the hydrogen concentration in the space leading to the anode and the space leading to the cathode. The space leading to the anode and the space leading to the cathode were filled with mixed gas of hydrogen and nitrogen while the cell was paused; thus, the cell was in pause states in which the hydrogen concentration of this mixed gas was made to be five kinds of nil, 0.1, 0.5, 3.0, and 10.0 vol. %. In order to evaluate these fuel cell characteristics, the DSS test was repeated for 100 days similarly to that in Embodiment 1, and generated-voltage variation over time was investigated. The conclusion of the degradation rates in each of the cells is represented in table 1. Here, the degradation rate represents the decreasing amount of the generated voltage before and after the DSS test.

TABLE 1

| | Hydrogen concentration (vol. %) | | | | |
|---|---|---|---|---|---|
| | 0 | 0.1 | 0.5 | 3.0 | 10.0 |
| Degradation rate (mV/100 times) | 90 | 6 | 5 | <2 | <2 |

From table 1, it has been ascertained that deterioration of the cell characteristics, due to the oxidation of the electrodes, can be prevented when the hydrogen concentration in the fuel cell during the cell pause is 0.1 vol. % or more.

Embodiment 3

Figure 4:
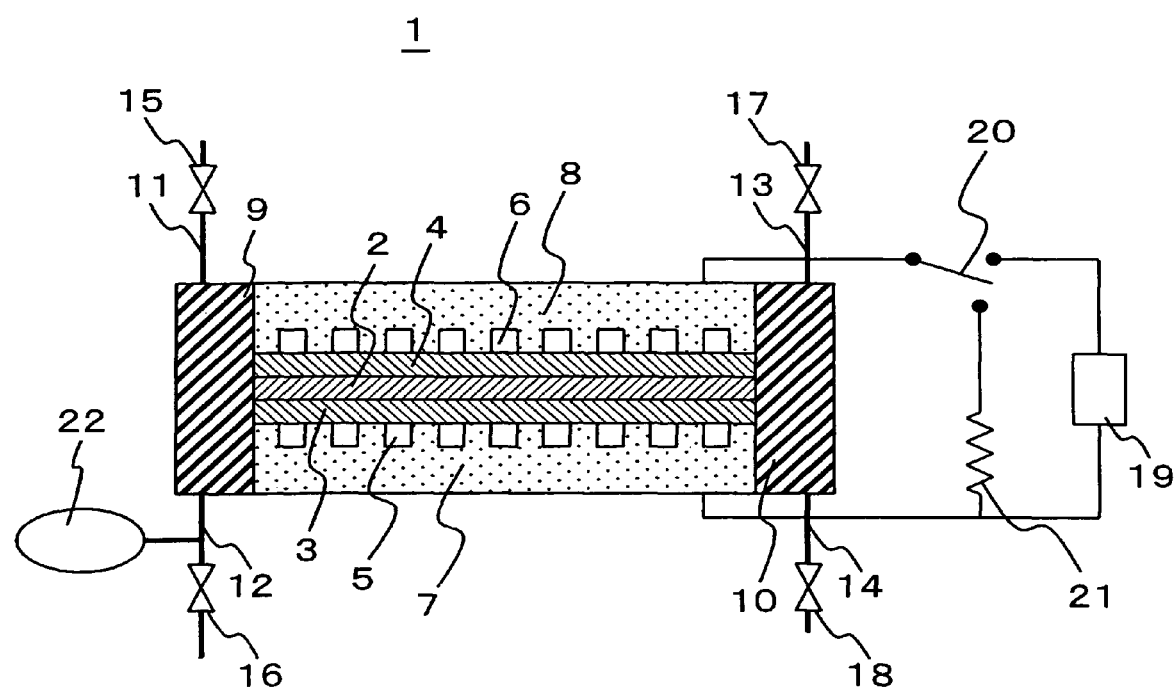
FIG. 4 is a schematic view illustrating an outline of a fuel cell according to Embodiment 3 of the present invention.

The more the hydrogen amount existing in the space leading to the anode, the more the electrode degradation due to mixedly penetrated air from the exteriors during the cell pause can be prevented. By providing means such as a fuel-gas filling means, in addition to the anode gas supplying line, as an extra line, and providing such as an aluminum gas pack, which is deformable depending on increasing or decreasing the interior pressure, the space-volume leading to the anode is increased, and then the space is filled with fuel gas including hydrogen; thereby, the measure to prevent the electrode oxidation can also be taken even when air mixedly penetrates from the exteriors. FIG. 4 is a schematic view illustrating a fuel cell according to Embodiment 3. In FIG. 4, the elements similar to those in Embodiment 1 are denoted with the same numerals. In this embodiment, an aluminum gas pack 22 is connected to the fuel-gas supplying line 12 as a mechanism for supplying fuel gas.

In this embodiment, a space volume leading to the anode, needed for maintaining the hydrogen concentration in both the spaces leading to the anode and the cathode equal to or higher than 0.1 vol. %, was estimated. Relationships among permissible amounts of mixedly penetrated air, hydrogen amounts in the space leading to the anode, and hydrogen concentration in the space leading to the anode and the space leading to the cathode are explained in the following paragraph.

When air is mixedly penetrated from the exteriors into the space leading to the anode or the space leading to the cathode, its mixedly penetrating rate is given as $\alpha$ (ml/min). Given that the hydrogen concentration in the space leading to the anode when the cell shut down is $C_{H2-a}$ (vol. %), the volume of the space leading to the anode is $V_a$ (ml), the volume of the space leading to the cathode is $V_c$ (ml), and the paused time till the fuel cell is started up is $T_R$ (min), the hydrogen concentration (when the cell starting up) in the space leading to the anode and the space leading to the cathode is represented by following equation (2).

$$C_{H2-cell} = (V_a \times C_{H2-a} - 2\alpha \times T_R)/(V_a + V_c) \quad (2)$$

Therefore, in equation (2), when the other parameters ($C_{H2-cell}$, $V_a$, $V_c$, and $T_R$) are set to certain specified values, $V_a$ can be designed by suitably selecting the volume of the gas pack 22 so that the hydrogen concentration (when the cell starting up) of $C_{H2-cell}$ in the space leading to the anode and the space leading to the cathode becomes equal to or higher than 0.1 vol. %.

Embodiment 4

In Embodiment 1, by closing the gas-amount adjusting means for supplying to/exhausting from the cathode the oxidant was consumed with the oxidant-utilizing rate being made infinite; however, as a method of increasing the oxidant-gas utilization, a method of replacing the gas on the cathode side with an inert gas that does not include oxidant is also available. In Embodiment 4, a fuel cell similar to that in Embodiment 1 was used.

An operation of the fuel cell in this embodiment is explained. When the generation was carried out with the same procedure as that in Embodiment 1, the generated voltage was 0.73 V. After 100 hours continuous operation, the generation of the fuel cell 1 was shut down according to the following procedure. The load between the anode 3 and the cathode 4 was at first changed from the external load 19 to the resistor 21 (30 mΩ) using the switch 20, and then the oxidant gas being supplied to the cathode side was changed from air to nitrogen. Oxygen can be consumed with the oxidant-gas utilization, which is 50% in normal operation, being infinitely increased by this operation. As another method of increasing the oxidant-gas utilization, if there are no concerns about equipment and safety, a method of diluting the oxidant gas using gases that do not include oxidant, or their mixture can be used. Gases that do not include oxidant can be selected from those including inert gases such as argon and carbon dioxide, water vapor, and hydrocarbon such as methane, other than nitrogen.

In ten minutes after the oxidant gas had been changed from air to nitrogen, the generated voltage varied from 0.73 V to 0.06 V, and the hydrogen evolution in the cathode was ascertained. After the hydrogen evolution on the cathode was ascertained, by the oxidant-gas supplying-amount adjusting means 15 and the oxidant-gas exhausting-amount adjusting means 17 being closed, the flowing rate of nitrogen was made nil ml/min; moreover, by the fuel-gas supplying-amount adjusting means 16 and the fuel-gas exhausting-amount adjusting means 18 being closed, the flowing rate of hydrogen was made nil ml/min. Accordingly, when the cell is in a paused state, the gas-amount adjusting means 15, 16, 17 and 18 on the gas supplying/exhausting lines of the anode and cathode were in a closed state; thereby the space leading to the anode and the space leading to the cathode were maintained in a hermetically sealed state filled with hydrogen.

In order to evaluate the fuel cell characteristics according to this embodiment, the DSS test was repeated for 100 days similarly to that in Embodiment 1, so that generated-voltage variation over time in the fuel cell was measured. As a result, the generated voltage decreased little for 100 days.

In a method of controlling the fuel cell configured as described above, in a case in which air penetrates from the exteriors into the space leading to the anode or the space leading to the cathode during the cell pause, because hydrogen always exists inside, a redox reaction between oxygen in the air and the hydrogen occurs to produce water; consequently, the penetrated oxygen is consumed. As a result, the losses of the carbon particles in the catalyst layer as well as the electrode degradation can be prevented.

Moreover, the cathode of the fuel cell that is at relatively high potential during the operation is exposed in the oxidation atmosphere; however, the cathode comes into a reductive atmospheric state, due to, as with the embodiment, hydrogen produced by the cathode potential being decreased during the cell pause. Therefore, even if oxide, which can deteriorate the electrochemical reactivity, evolves on the faces of the catalysts in the cathode catalyst layer during the operation, the reduction processing is performed during the cell pause; consequently, there is an effect of the cathode catalysts being activated again.

Embodiment 5

Figure 5:
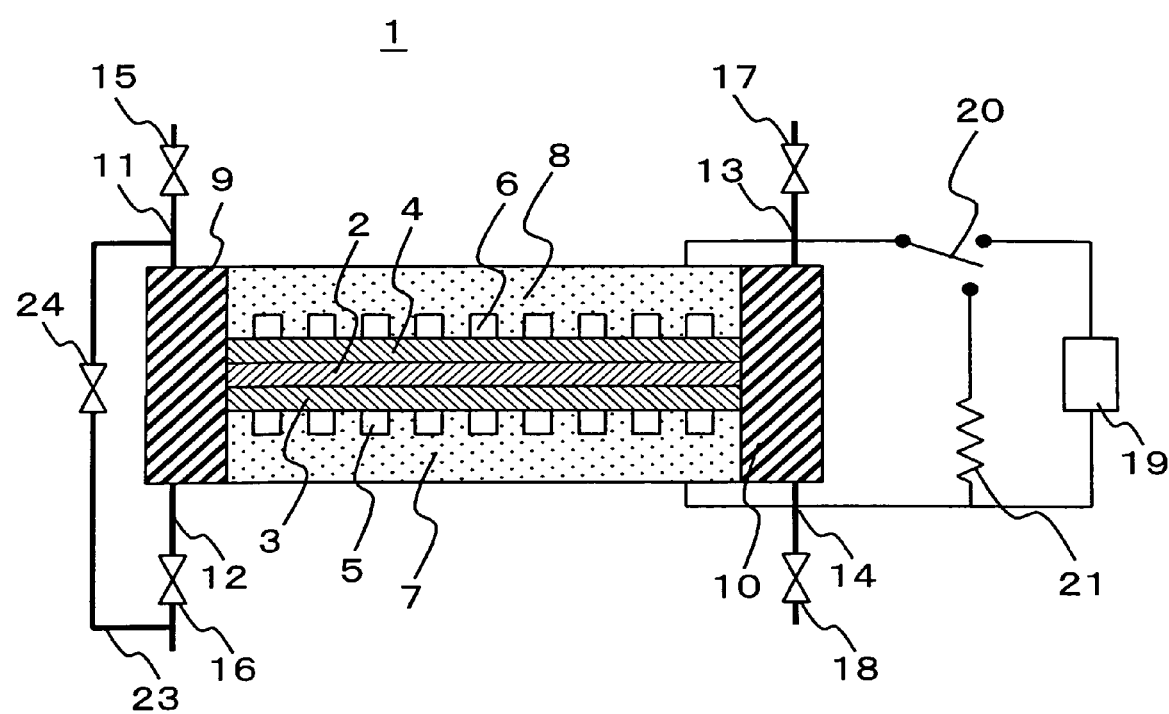
FIG. 5 is a schematic view illustrating an outline of a fuel cell according to Embodiment 5 of the present invention.

In Embodiment 1, by oxidant-gas supplying being shut down during the operational stop, the oxidant gas in the cathode is consumed, so as to evolve hydrogen gas; however, a method, in which another line is provided in the space leading to the cathode to create a hydrogen atmosphere in the space leading to the cathode, being directly filled with fuel gas, is also effective in preventing electrode deterioration due to air penetration during the cell pause. FIG. 5 is a schematic view illustrating a fuel cell 1 according to Embodiment 5. In FIG. 5, elements similar to those in Embodiment 1 are represented by the same numerals. In this embodiment, in order for the oxidant-gas supplying line 11 to be filled with fuel gas, a fling-gas supplying line 23 is connected to the line through a filling-gas supplying-amount adjusting means 24.

In the fuel cell configured as described above, because the generation method is the same as that in Embodiment 1, its shut down and pausing methods are explained here. In the normal operation, the fling-gas supplying-amount adjusting means 24 is closed. After 100 hours of continuous operation, at first, the load between the anode 3 and cathode 4 was changed from the external load 19 to the resistor 21 using the switch 20, and then the oxidant-gas supplying-amount adjusting means 15 and oxidant-gas exhausting-amount adjusting means 17 were closed so that the air flow rate was nil ml/min. Thereby, because oxygen in air remaining in the cathode 4 reacts with hydrogen to produce water, only nitrogen exists in the interior of the oxidant-gas supplying line 11 connected to the cathode 4, and the potential becomes equal to or lower than the hydrogen evolution potential (approximately 0.1 V). Next, by adjusting the filling-gas supplying-amount adjusting means 24, fuel gas is supplied to the oxidant-gas supplying line 11 through the filling-gas supplying line 23. At this moment, by adjusting the fuel-gas supplying-amount adjusting means 16 and the filing-gas supplying-amount adjusting means 24, fuel gas is supplied to the oxidant-gas supplying line 11 and the fuel-gas supplying line 12 in such a way that both have approximately the same pressure as atmospheric air, and thus the fuel cell 1 is paused.

In order to evaluate the fuel cell characteristics in this embodiment, DSS test was repeated for 100 days similarly to that in Embodiment 1, generated-voltage variation over time in the fuel cell was measured. As a result, the generated voltage decreased little for 100 days.

In the method of controlling the fuel cell system configured as described above, even if air penetrates into the space leading to the anode or the space leading to the cathode from the exteriors during the cell pause, because hydrogen always exits in the interior, redox reaction between the oxygen in the air and the hydrogen occurs to produce water; consequently, the oxygen having been penetrated is consumed. As a result, the losses of the carbon particles in the catalyst layer can be reduced, and the electrode degradation can be prevented accordingly.

Moreover, the cathode of the fuel cell that is at relatively high potential during the operation is exposed in the oxidation atmosphere; however, the cathode comes into a reductive atmospheric state, due to hydrogen produced by the cathode potential being decreased during the cell pause. Therefore, even if oxide, which can deteriorate the electrochemical reactivity, evolves on the faces of the catalysts in the cathode catalyst layer during the operation, the reduction processing is performed during the cell pause, resulting in an effect of the cathode catalysts being activated again.

Embodiment 6

Figure 6:
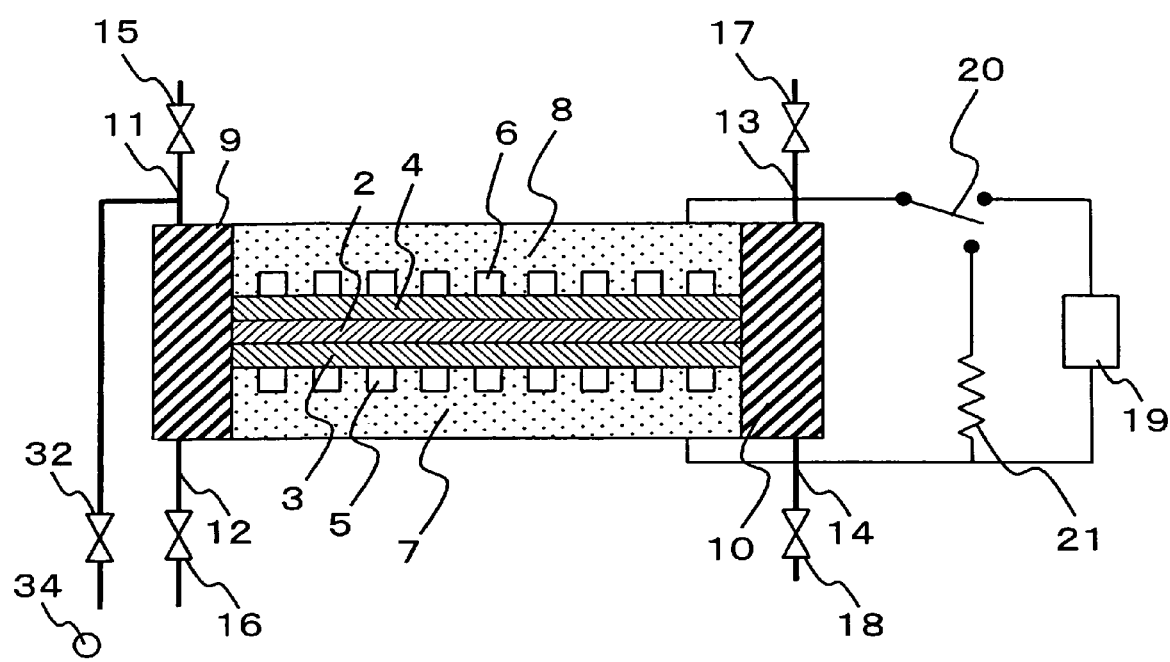
FIG. 6 is a schematic view illustrating an outline of a fuel cell according to Embodiment 6 of the present invention.

FIG. 6 is a schematic view illustrating a fuel cell 1 according to Embodiment 6. In FIG. 6, elements similar to those in Embodiment 1 are represented by the same numerals. Although in Embodiment 5 fuel gas is supplied to the oxidant-gas supplying line through the by-pass gas-supplying line, and stored therein, in this embodiment, a gas pack 33 is connected to the oxidant-gas supplying line 11 through a gas-amount adjusting means 32 as illustrated in FIG. 6. Reductant 34 is contained in the gas pack 33. As the reductant 34, for example, zinc metal powder can be used.

A method of controlling the fuel cell 1 configured as described above is explained. Because the generation method for the fuel cell 1 is the same as that in Embodiment 1, a method of shutting down and pausing the cell is explained here. Here, the gas-amount adjusting means 32 is closed during generation. After 100 hours of continuous operation, the load between the anode 3 and cathode 4 was at first changed from the external load 19 to the resistor 21 using the switch 20, and then the oxidant-gas supplying-amount adjusting means 15 and oxidant-gas exhausting-amount adjusting means 17 were closed so that the air flow rate was nil ml/min. Thereby, because oxygen in the air remaining in the cathode 4 reacts with hydrogen to produce water, only nitrogen exists in the interior of the oxidant-gas supplying line 11 connected to the cathode 4, and the potential becomes equal to or lower than the hydrogen evolution potential (approximately 0.1 V). Next, the gas-amount adjusting means 32 was opened so that the oxidant-gas supplying line 11 and the gas pack 33 conducted to each other; moreover, by adjusting the fuel-gas supplying-amount adjusting means 16 the fuel-gas supplying line 12 was adjusted so that the fuel-gas supplying line 12 was almost filled with the fuel gas under approximately the same pressure as atmospheric pressure, and thus the fuel cell 1 was paused.

In order to evaluate the fuel cell characteristics in this embodiment, the DSS test was repeated for 100 days similarly to that in Embodiment 1, generated-voltage variation over time in the fuel cell was measured. As a result, the generated voltage decreased little for 100 days.

In the method of controlling the fuel cell 1 configured as described above, if air penetrates into the oxidant-gas supplying line 11, because the line is connected to the gas pack 33 containing the reductant 34, the oxygen in the air is consumed by the reductant 34. Moreover, if air penetrates into the fuel-gas supplying line 12, the oxygen in the air reacts with hydrogen, and thus the oxygen is consumed. As a result, the losses of the carbon particles in the catalyst layer can be reduced, and the electrode degradation can also be prevented.

Moreover, the cathode of the fuel cell that is at relatively high potential during the operation is exposed in the oxidation atmosphere; however, the cathode comes into a reductive atmospheric state, due to hydrogen produced by the cathode potential being decreased during the cell pause. Therefore, even if oxide, which can deteriorate the electrochemical reactivity, evolves on the faces of the catalysts in the cathode catalyst layer during the operation, the reduction processing is performed during the cell pause, resulting in an effect of the cathode catalysts being activated again.

Here, in this embodiment, the zinc metal powder is used as the reductant; however, another material can also be used as far as it is more easily oxidized than the electrode material. For example, a solid material such as magnesium metal powder, alkaline-metal powder of lithium, sodium, etc., liquid material such as oxalic acid aqueous solution, or gas material such as methane gas, hydrogen disulfide gas, etc. can also be used.

Embodiment 7

Figure 7:
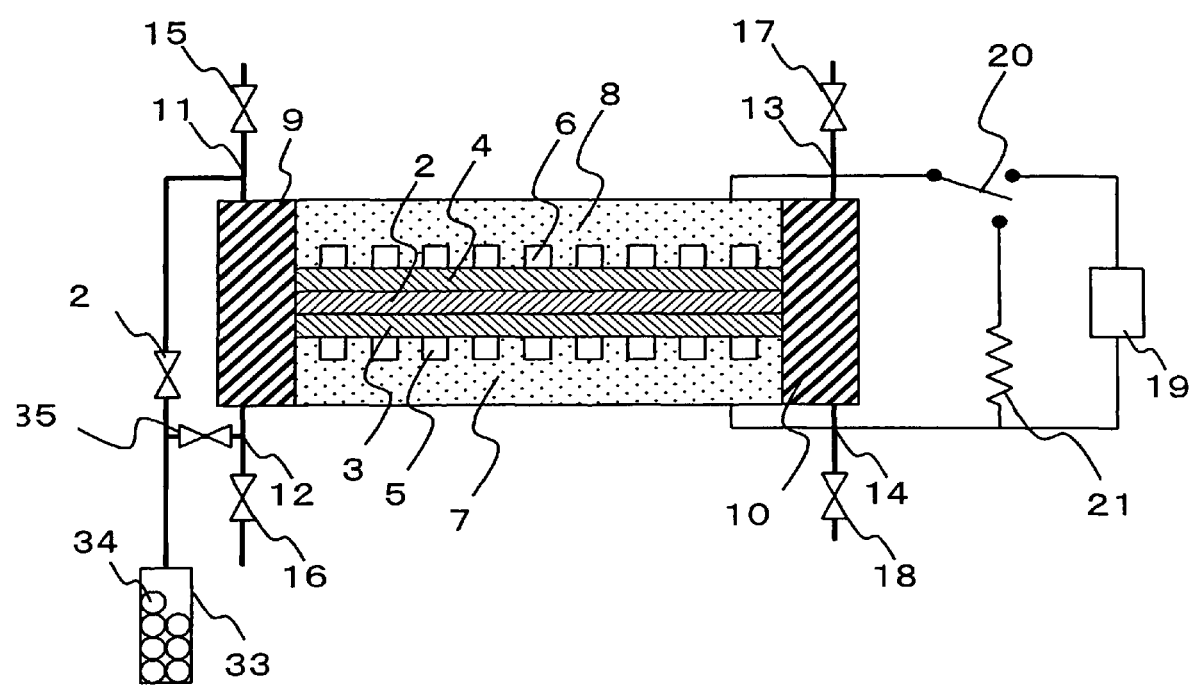
FIG. 7 is a schematic view illustrating an outline of a fuel cell according to Embodiment 7 of the present invention.

FIG. 7 is a schematic view illustrating a fuel cell 1 according to Embodiment 7. In Embodiment 6, the gas pack containing the reductant was connected only to the oxidant-gas supplying line through the gas-amount adjusting means; however, in this embodiment, the gas pack 33 is connected to the oxidant-gas supplying line 11 and the fuel-gas supplying line 12 through the gas-amount adjusting means 32 and a gas-amount adjusting means 35, respectively, as illustrated in FIG. 7. The reductant 34 are contained in the gas pack 33. As the reductant 34, for example, zinc metal powder can be used.

In the fuel cell 1 configured as described above, when the fuel cell 1 operates, both the gas-amount adjusting means 32 and 35 are closed. When the fuel cell 1 was shut down, by closing the fuel-gas supplying-amount adjusting means 15, the oxidant-gas supplying-amount adjusting means 16, the oxidant-gas exhausting-amount adjusting means 17, and the fuel-gas exhausting-amount adjusting means 18, the fuel-gas supplying line 11 and oxidant-gas supplying line 12 were hermetically sealed, and the gas-amount adjusting means 32 and 35 were opened so that both the fuel-gas supplying line 11 and the oxidant-gas supplying line 12 conducted to the gas pack 33, and thus the cell was paused. In this control method, if air penetrates into the oxidant-gas supplying line 11, or the fuel-gas supplying line 12 from the exteriors during the cell pause, because the line is connected to the gas pack 33 that contains the reductant 34, the oxygen in the air is exhausted by the reductant 34. As a result, the losses of the carbon particles in the catalyst layer can be reduced, and the electrode degradation can also be prevented.

The cathode of the fuel cell that is at relatively high potential during the operation is exposed in the oxidation atmosphere; however, the cathode comes into a reductive atmospheric state, due to hydrogen produced by the cathode potential being decreased during the cell pause. Therefore, even if oxide, which can deteriorate the electrochemical reactivity, evolves on the faces of the catalysts in the cathode catalyst layer during the operation, the reduction processing is performed during the cell pause, resulting in an effect of the cathode catalysts being activated again.

Moreover, in Embodiment 5 and Embodiment 8, because the oxidant-gas supplying line 11 or fuel-gas supplying line 12 needs to be supplied with fuel gas under approximately atmospheric pressure during the cell pause, fuel gas is consumed a little; however, in this embodiment, because the fuel gas need not be supplied during the cell pause, the preserving procedure becomes simple in low-cost.

Here, although in this embodiment, the zinc metal powder is used as the reductant, a solid material such as magnesium metal powder, alkaline-metal powder of lithium, sodium, etc., liquid material such as oxalic acid aqueous solution, or a gas material such as methane gas, hydrogen disulfide gas, etc. can also be used as other materials.

Embodiment 8

Embodiment 8 is configured in such a way that, in Embodiment 7, the gas pack 33 is configured using a vessel that is flexible and hermetically sealable, for example, made of rubber, without the reductant 34. In the fuel cell configured as described above, the generation is performed by the fuel cell in a state in which the gas-amount adjusting means 35 is closed, meanwhile the gas-amount adjusting means 32 is opened. Thereby, fuel gas is supplied from the fuel-gas supplying line 12 into the gas pack 33, and the flexible gas pack 33 becomes inflated under the supplying pressure of the fuel gas. When the fuel cell was shut down, by closing the fuel-gas supplying-amount adjusting means 15, the oxidant-gas supplying-amount adjusting means 16, the oxidant-gas exhausting-amount adjusting means 17, and the fuel-gas exhausting-amount adjusting means 18, the fuel-gas supplying line 11 and the oxidant-gas supplying line 12 were hermetically sealed, and the gas-amount adjusting means 32 and 35 were opened, so that both the fuel-gas supplying line 11 and the oxidant-gas supplying line 12 conducted to the gas pack 33, and thus the cell was paused.

In this control method, if air is penetrated into the oxidant-gas supplying line 11, or the fuel-gas supplying line 12 from the exteriors during the cell pause, because the line is connected to the gas pack 33, the oxygen in the air is consumed by the hydrogen in the fuel gas that has been stored in the gas pack 33. As a result, the losses of the carbon particles in the catalyst layer can be reduced, and the electrode degradation can be prevented accordingly.

The cathode of the fuel cell that is at relatively high potential during the operation is exposed in the oxidation atmosphere; however, the cathode comes into a reductive atmospheric state, due to hydrogen produced by the cathode potential being decreased during the cell pause. Therefore, even if oxide, which can deteriorate the electrochemical reactivity, evolves on the faces of the catalysts in the cathode catalyst layer during the operation, the reduction processing is performed during the cell pause, resulting in an effect of the cathode catalysts being activated again.

Moreover, because the gas pack 33 is composed of the flexible vessel, even if the fuel-gas supplying line 11 and the oxidant-gas supplying line 12 come under a reduced-pressure state in response to temperature drop when the fuel cell is shut down, fuel gas is supplied from the gas pack 33, resulting also in an effect of preventing air penetrated from the exteriors. Furthermore, in Embodiment 5 and Embodiment 6, because fuel gas needs to be supplied to the oxidant-gas supplying line 11 or the fuel-gas supplying line 12 under approximately atmospheric pressure during the cell pause, the fuel gas is consumed a little; however, in this embodiment, because the fuel gas need not be supplied during the cell pause, the preserving procedure becomes simple in low-cost.

In this embodiment, by estimating or measuring in advance an amount of air penetrated into the fuel-gas supplying line 11 and oxidant-gas supplying line 12 for a period in which the fuel cell is paused after shut down, for example, for 16 hours when the DSS test is performed, the interior volume of the gas pack 33 is determined so that sufficient volume of fuel gas can be stored to deoxidize and exhaust oxygen in the penetrated air.

Here, in this embodiment, although an example in which reductant is not contained in the gas pack 33 has been represented, the gas pack may be configured to contain reductant. In this case the ability to consume oxygen against the air penetrated during the cell pause may further increase. Moreover, in this embodiment, although fuel gas is supplied to the gas pack 33 through the fuel-gas supplying line, the fuel gas may be supplied from those other than the fuel-gas supplying line, for example, from another hydrogen cylinder.

Embodiment 9

In Embodiment 1, fuel cells in which resistance of the resistor 21 was varied at 15, 25, 30 (Embodiment 1), 50 and 80 mΩ were made; then, DSS test was carried out for 100 days in the generating and pausing methods similar to those in Embodiment 1, and the decreasing amounts of the generated voltages after the DSS test were measured, comparing the amounts to those measured before the DSS test. In this case, the external load having the loading control function similar to that in Embodiment 1 was used. The relationships between resistances of the resistor 21 and decreasing amounts of the generated voltages are listed in table 2.

TABLE 2

|  | Resistance (mΩ) | | | | |
| --- | --- | --- | --- | --- | --- |
|  | 15 | 25 | 30 | 50 | 80 |
| Decreased ratio (mV) | 200 | 0.9 | 1.0 | 1.4 | 1.5 |

In table 2, when the resistance fell between 25-80 mΩ, the decreased amount of the voltage after the DSS test of 100 days was found to be equal to or lower than 2 mV. In a case in which the resistance of the resistor 21 is equal to or smaller than 15 mΩ, excessive current instantaneously flows in the fuel cell, when the circuit is switched from the external load 19 to the resistor 21 by the switch 20 when the operation is shut down. Specifically, when the resistance is 15 mΩ, current of approximately 37.5 A flows in the fuel cell, and the fuel gas utilization becomes 120%; thus, the fuel gas temporarily shorts. The continual generation in the fuel cell in the state of the fuel gas shortage causes oxidation-corrosion degradation of the carbon particles formed in the anode-catalyst layer. Accordingly, due to this degradation, the electrochemical reactivity of the anode-catalyst layer is deteriorated, causing the decreasing of the generated voltage.

As described above, the resistance of the resistor whose connection is switched from the external load to the cell when the fuel cell is shut down, needs to be determined in a suitable range. The limiting value of the resistance in the lower side is explained. In a case in which the resistance decreases, the current flowing in the fuel cell increases when the resistor is connected. Here, because the utilization of the fuel gas must not exceed 100%, given that the fuel-cell voltage is A (V), the current flowing the external load is B (A), and the utilization of the fuel cell is C (%) when the normal operation is performed with the external load being connected, the resistance R (Ω) of the resistor may be equal to or higher than (A/B)×(C/100). If the resistance is equal to or higher than this value, when the connection is switched from the external load 19 to the resistor 21, the gas utilization cannot exceed 100%, resultantly the state of the fuel gas shortage does not occur.

That is, in a case in which the connection is switched from the external load 19 to the resistor 21 when the fuel cell is shut down, if the resistance R (Ω) of the resistor 21 is R≧(A×C)/(B×100), the fuel cell voltage becomes a suitable value when the generation is shut down and the cell is paused; consequently, the decreasing of the generated voltage during the operation can be prevented.

What is claimed is:

1. A method of controlling a fuel cell system, the method comprising:
    supplying a hydrogen-containing fuel gas to an anode of a fuel cell using a fuel gas supply line;
    supplying an oxidant gas to a cathode of the fuel cell using an oxidant gas supply line;
    generating electricity by connecting an external load between the anode and the cathode;
    stopping the generating by disconnecting the external load, connecting a resistor between the anode and the cathode, stopping the supplying of the oxidant gas to the cathode to cause a potential at the cathode to drop, stopping the supplying of the hydrogen-containing fuel gas to the anode after the potential at the cathode drops to a potential value equal to or lower than a potential value at which hydrogen evolution starts, and evolving hydrogen at the cathode from the hydrogen-containing fuel gas which has been supplied to the anode; and
    filling a space leading to the cathode and a space leading to the anode with the hydrogen-containing fuel gas after the stopping the generating.

2. The method of controlling a fuel cell system as recited in claim 1, wherein a hydrogen concentration in the space leading to the anode and in the space leading to the cathode is at least 0.1 vol. % during the stopping the supplying of the hydrogen-containing fuel gas to the anode.

3. The method of controlling a fuel cell system as recited in claim 1, further comprising:
    replenishing the hydrogen-containing fuel gas to the fuel gas supply line during the stopping the supplying of the hydrogen-containing fuel gas.

4. The method of controlling a fuel cell system as recited in claim 1, further comprising:
    supplying an inert gas to the cathode while stopping the supplying of the oxidant gas; and
    stopping the supplying of the inert gas to the cathode after the potential at the cathode drops to a potential value equal to or lower than a potential value at which hydrogen evolution starts.

5. The method of controlling a fuel cell system as recited in claim 1, wherein during the generating electricity, a voltage between the cathode and the anode is A (V), a current flowing through the external load is B (A), and a fuel-gas utilization rate is C (%), and a resistance R (Ω) of the resistor satisfies the equation:

$$R \geq (A \times C)/(B \times 100).$$

6. A method of controlling a fuel cell system, the method comprising:
    supplying a hydrogen-containing fuel gas to an anode of a fuel cell using a fuel gas supply line;
    supplying an oxidant gas to a cathode of the fuel cell using an oxidant gas supply line;
    generating electricity by connecting an external load between the anode and the cathode; and
    stopping the generating by disconnecting the external load, connecting a resistor between the anode and the cathode, stopping the supplying of the oxidant gas to cause a potential at the cathode to drop, supplying a reductant to a space leading to the anode and a space leading to the cathode after the potential at the cathode drops to a potential value equal to or lower than a potential value at which hydrogen evolution starts, evolving hydrogen at the cathode from the hydrogen-containing fuel gas which has been supplied to the anode, and devolving oxides formed on the cathode.

7. The method recited in claim 1, wherein the supplying of the hydrogen-containing fuel is stopped after the potential at the cathode drops to 0.1 V.

8. The method of controlling a fuel cell system as recited in claim 6, during the generating electricity, a voltage between the cathode and the anode is A (V), a current flowing through the external load is B (A), and a fuel-gas utilization rate is C (%), and a resistance R (Ω) of the resistor satisfies the equation:

$$R \geq (A \times C)/(B \times 100).$$

9. The method recited in claim 6, wherein the fuel cell is paused after the potential at the cathode drops to 0.1 V.

10. The method recited in claim 6, wherein the reductant is a zinc metal powder.

11. The method recited in claim 6, wherein the reductant includes one of a zinc metal powder, a magnesium metal powder, an alkaline-metal powder of lithium, an alkaline-metal powder of sodium, an oxalic acid aqueous solution, a methane gas, and a hydrogen disulfide gas.

12. A method of controlling a fuel cell system, the method comprising:
supplying a hydrogen-containing fuel gas to an anode of a fuel cell using a fuel gas supply line;
supplying an oxidant gas to a cathode of the fuel cell using an oxidant gas supply line;
generating electricity by connecting an external load between the anode and the cathode;
stopping the generating by disconnecting the external load, connecting a resistor between the anode and the cathode, stopping the supplying of the oxidant gas to cause a potential at the cathode to drop, stopping the supplying of the hydrogen-containing fuel gas to the anode after the potential at the cathode drops to a potential value equal to or lower than a potential value at which hydrogen evolution starts, and evolving hydrogen at the cathode from the hydrogen-containing fuel gas which has been supplied to the anode; and
filling a space leading to the cathode and a space leading to the anode with an inert gas after the stopping the generating.

* * * * *